United States Patent Office 3,354,639
Patented Nov. 28, 1967

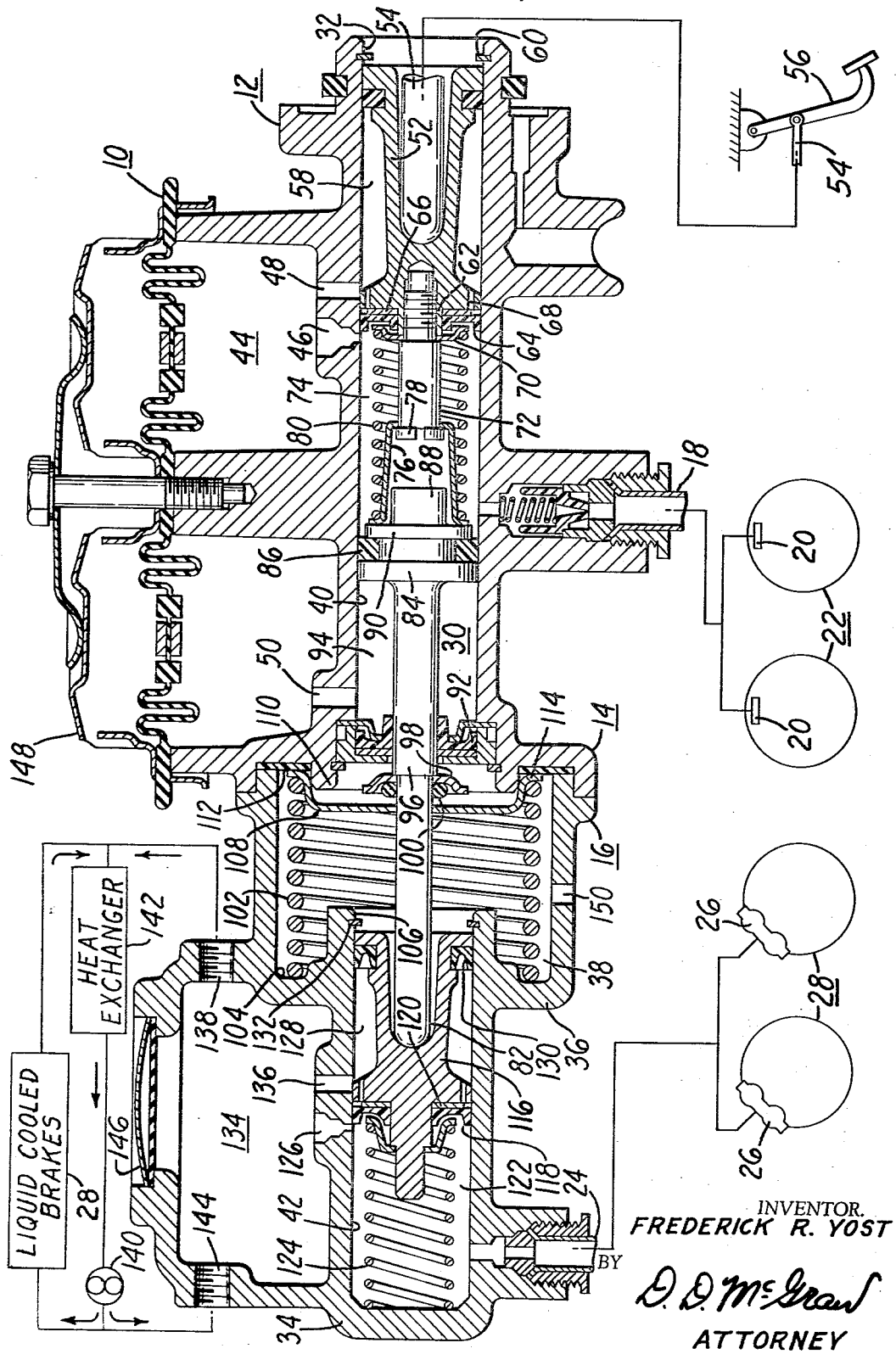

3,354,639
DUAL FLUID PRESSURIZING MECHANISM
Frederick R. Yost, Dayton, Ohio, assignor to General Motors Corporation, Detroit, Mich., a corporation of Delaware
Filed Oct. 21, 1965, Ser. No. 499,472
15 Claims. (Cl. 60—54.5)

ABSTRACT OF THE DISCLOSURE

A brake mechanism including a dual master cylinder asembly having two completely independent fluid circuits, one fluid circuit pressurizing one set of brakes and the other fluid circuit pressurizing another set of brakes, the fluid circuits being separated in the master cylinder assembly by a chamber preventing cross-contamination of the two fluid circuits. The pressurizing pistons for the two circuits are arranged so that actuation of the second piston is accomplished through movement of the first piston by a brake pedal. A spring is provided which will withhold pressurizing movement of the second piston until some pressurization by the first piston has occurred, so as to accommodate a drum brake-disc brake combination wherein the drum brake shoes must be moved outwardly by pressurization of the first circuit to a certain pressure, although the disc brakes require no such movement prior to braking engagement. The master cylinder assembly is disclosed as being arranged so that the brake fluid in the second circuit also is utilized as a brake cooling fluid in a separate circuit, the second circuit and the cooling circuit having a common fluid reservoir.

The invention relates to a mechanism for pressurizing fluid in separate fluid circuits, and more particularly to such mechanism when utilized as a master cylinder for a vehicle brake system. It has been common in recent years to provide a vehicle with separate pressurizing systems for separate pairs of brake units, such as the front brakes and the rear brakes. Master cylinder assemblies recently utilized in production vehicle have had the pressurizing pistons arranged in a tandem manner with one of the pressurizing chambers connected to the rear brake wheel cylinders and the other of the pressurizing chambers connected to the front brake wheel cylinders. Since such systems have utilized the same type of fluid in both circuits, a common fluid reservoir has often been provided. In some instances separate reservoirs have been provided only because it is desirable from a safety standpoint to prevent the loss of fluid from a correctly operating circuit because of a malfunction in another fluid circuit. Little consideration has been given to the likelihood of cross contamination of the two fluid circuits since the fluid in each circuit has been identical.

It is now proposed to provide a dual master cylinder having separate pressurizing chambers each connected to its own fluid circuit and with the various chambers in the master cylinder so arranged that there is no possibility of contaminating the fluid of one circuit with the fluid of another circuit. This is particularly desirable in instances where different types of fluid may be utilized in the two circuits. The mechanism embodying the invention provides for dual fluid circuits or systems each having its own pressurizer, its own fluid reservoir, and its own conduits to the pressure operated members associated therewith.

A brake utilizing the invention is particularly advantageous when a hybrid brake arrangement is provided such as the use of disc brakes on one set of wheels and drum brakes on the other set of wheels. It is advantageous for several well known reasons in such a hybrid arrangement to provide disc brakes on the front wheels and drum brakes on the rear wheels. Since these two types of brakes have different operating characteristics and requirements, it is deirable to provide different master cylinder pressurizing charcteristics for each set of brakes. A master cylinder mechanism embodying the invention permits the utilization of a constant bore housing but provides for changing the pressurization timing and rate for one set of brakes as compared to the other set of brakes so that the brakes may be balanced in actuation. In instances where one set of brakes, for example, require an initial pressurization in order to position the brake shoes for engagement with a brake friction surface, the mechanism embodying the invention provides for this initial pressurization and withholds pressurization of the other set of brakes at a predetermined rate relative to pressurization of the one set of brakes.

The invention also provides for the pressurizing movement of the secondary pressurizing piston to a sufficient extent to disconnect the secondary fluid pressurizing chamber from its fluid reservoir, thus positioning it for immediate fluid pressurizing action, while withholding such action until the primary fluid pressurizing piston has been displaced a sufficient amount to pressurize fluid in the primary fluid pressurizing chamber to a predetermined value. This is advantageous when the primary pressurizing chamber is connected to actuate drum brakes with shoes which must be moved into contact with the brake drums against the force of retraction springs while the secondary pressurizing chamber is connected to actuate disc brakes which maintain the brake pads in light engagement with the disc at all times.

It is also a feature of the invention to provide for pressurization force for one set of brakes to be applied primarily through fluid pressurization of fluid in the pressurizing chamber connected with the other set of brakes. In addition, provision is made for the pressurization of one set of brakes mechanically; should for some reason pressurization of fluid in the pressurizing chamber for the other set of brakes be insufficient to provide the necessary actuating force.

Mechanism embodying the invention is particularly advantageous when one fluid pressurizing circuit requires a fluid cooling arrangement. Such a circuit often uses a mineral oil based fluid which must not be allowed to become contaminated or to contaminate the other fluid circuit which may have a non-mineral oil based fluid therein. The mechanism provides distinctly different mechanism and methods of replacing fluid in each circuit so that inadvertent cross contamination is unlikely to occur.

In the drawing:

The figure is a cross section view of a dual fluid pressurizing mechanism embodying the invention in a master cylinder construction for a vehicle having separate front and rear brake ssytems, such systems being schematically illustrated.

The mechanism 10 in which the invention is embodied is a dual master cylinder assembly. The housing 12 is divided into a rear section 14 and a front section 16 which are suitably fastened together. The rear section contains the mechanism for pressurizing fluid conducted through the conduit 18 to the wheel cylinders 20 of the wheel brake assemblies 22. These brake assemblies are schematically illustrated as being drum brakes and in the system embodiment shown in the drawing are the rear brakes of the vehicle. The front housing section 16 contains mechanism for pressurizing fluid delivered through conduit 24 to the wheel cylinder assemblies 26 of the wheel brake assemblies 28. The brake assemblies 28 are illustrated as being disc brakes with the wheel cylinders 26 being provided in a suitable caliper arrangement. In the system embodiment shown, the wheel brake assemblies 28 are the front brakes of the vehicle.

A bore 30 is provided in the housing 12 with its open end 32 being at the rear of the rear housing section and its closed forward end 34 being at the front of the front housing section. A rear portion 36 of the front housing is enlarged to provide a chamber 38 therein which interrupts the bore 30 so that the bore is divided into a rear section 40 and a front section 42.

The rear housing section 14 is formed to include a reservoir chamber 44 which has compensating ports 46 and 48 and pressure relief port 50 connecting with the rear bore section 40. A primary piston 52 is positioned in the rear bore section 40 so that the push rod 54 extends through the bore open end 32 and engages the piston for piston actuation. The push rod 54 is connected to a suitable brake actuation member which is schematically illustrated as the brake pedal assembly 56. A suitable brake booster may be provided for actuation of the master cylinder in appropriate circumstances. The primary piston 54 is spool shaped so that a fluid compensation chamber 58 is provided between the end lands of the piston and is always connected with the compensation port 48 and therefore with the fluid reservoir chamber 44. A suitable stop such as snap ring 60 provides a rear locater for the release position of the piston 52. The forward end of piston 52 has a boss 62 about which is received a pressure cup 64 and a cup backup disc 66. Suitable compensation passages 68 are formed through the forward piston land so that the cup 64, disc 66 and passages 68 cooperate to compensate the rear pressurizing chamber in the well known manner.

A spring seat 70 abuts the forward end of boss 62 and a piston extension 72 is threaded into a recess in the boss so that it extends forwardly into the primary pressurizing chamber 74. A spring retainer 76, which is generally hat-shaped, has its rear or crown end received about piston extension 72 and normally engages the enlarged head 78 of the extension 72. A preloaded compression spring 80 extends between the spring seat 70 and the forward or brim end of the spring retainer 76. The spring retainer 76 and the spring 80 are also located in the primary pressurizing chamber 74.

An intermediate push rod 82 is positioned within bore 30 and extends through chamber 38 and into bore sections 40 and 42. The rear end of rod 82 has a head 84 formed thereon so that it acts as a piston in the forward end of rear bore rear section 40. The head is grooved and receives a suitable seal 86 which engages the bore wall. The head has a boss 88 extending rearwardly so that the forward end of spring retainer 76 fits thereabout and engages the rear side of the flange 90 forming a part of the head 84. The forward end of bore rear section 40 has a seal 92 mounted therein which cooperates with the rod head 90 to provide a substantially unpressurized fluid chamber 94. This chamber is connected through relief port 50 with the reservoir chamber 44.

The portion of push rod 82 extending forwardly beyond seal 92 is provided with a shoulder 96 against which a washer 98 is positioned. The washer is slightly dish shaped with the rim thereof extending forwardly and is held in position by an O ring 100 which fits tightly about the push rod 82. The O ring 100 has a slightly greater cross section diameter than the amount of the depression provided in the washer 98 for reasons to be described. A compression spring 102 is received within chamber 38 of the housing forward section 16. The forward end of the spring 102 rests against a housing wall 104 which extends outwardly from the portion of the housing in which the bore forward section 42 is formed and is positioned slightly forward of the rear end 106 of the bore forward section. The rear end of spring 102 engages a spring seat 108 which is a dished washer received about push rod 82 adjacent the O ring 100 and is slidably movable relative to the intermediate push rod. The dished depression of spring seat 108 opens rearwardly and is sufficiently large to be received about a projecting forward end 110 of the rear housing section adjacent the position wherein seal 92 is retained. An annular gasket 112 of a suitable resilient material such as a synthetic rubber fits between the forward and rear housing sections so that chamber 38 is sealed at this point. The gasket 112 is also of sufficient radial width to be engaged by the outer annulus 114 of the spring seat 108. It can be seen that the O ring 100 and the gasket 112 act as silencers or snubbers so that when the washer 98 is moved forwardly with rod 82 into engagement with spring seat 108, a silent connection is first made as the O ring is compressed, and when the spring seat 108 moves rearwardly until its annulus 114 engages the gasket 112 a silent engagement is obtained.

The bore forward section 42 has a secondary pressurizing piston 116 received therein and provided with a suitable cup 118 and cup disc 120 on the forward end thereof so that the piston assembly cooperates with the forward end of the bore section to provide a secondary pressurizing chamber 122. A piston return spring 124 is positioned within chamber 122 and urges the piston rearwardly so that in the released position the cup 118 celars the compensating port 126. Piston 116 is a spool type piston so that it defines an annular substantially unpressurized chamber 128 which is sealed from chamber 38 by the piston rear seal 130. An snap ring 132 positioned at the rear end of the bore forward section 42, and adjacent chamber 38, provides a rear stop for the piston 116. The intermediate push rod 82 engages piston 116 for pressurizing force transmission thereto. The housing section 16 is also formed to provide the fluid reservoir chamber 134. Compensation port 126 is connected with chamber 134 and, when piston 116 is in the full release position, communicates fluid to the pressurizing chamber 122. Another compensation port 136 maintains reservoir chamber 134 in continuous fluid communication with the substantially unpressurized chamber 128.

In many applications in which the master cylinder assembly embodying the invention is utilized, it is desirable to maintain the brake fluid for the set of brakes connected to secondary pressurizing chamber 122 cooler by means of a heat exchange arrangement than it would otherwise be maintained. Therefore, the reservoir chamber 134 in such instances is provided with a fluid outlet passage 138 which is connected to the inlet of a pump 140 through a heat exchanger or cooler 142. The cooled fluid is returned to the reservoir through fluid inlet 144. The fluid circuit containing reservoir 134 is a secondary circuit with a very low flow rate as is sufficient only to maintain a satisfactory level in the reservoir. The primary circuit is used to cool the brakes of brake assemblies 28. Therefore brake assemblies 28 have suitable cooling fluid passages therein connected in series with pump 140 and heat exchanger 142 through which a higher flow rate is maintained at least when the brakes are energized. A suitable reservoir and refill arrangement is provided as a part of the cooling circuit. This system has an additional advantage in that the reservoir chamber 134 may be sealed by cap and seal assembly 146 in such a manner than the chamber may not be readily opened and refilled with the wrong type of fluid. This is particularly important when the nature of the front and rear brakes requires that two different fluids be used in the actuation of the wheel brake cylinders, with such fluid being mineral oil in the front brake system and non-mineral oil in the rear brake system for example. A mechanic can readily refill the system utilizing standard hydraulic brake fluid by removing the vented cover and diaphragm assembly 148 for reservoir chamber 44, but cannot readily remove the cap and seal assembly 146 for reservoir chamber 134. Instead the cooling circuit may be refilled at the pump, as is now common for power steering systems, or other suitable refill arrangements may be povided. There is therefore little likelihood of accidentally contaminating one fluid system or circuit with a fluid which belong in the other system or circuit. In addition, the provision of the buffer chamber 38 between the two pressurizing sections assures the maintenace of the fluid circuits in a non-cross contaminant condition. The buffer or anti-contaminant chamber 38 is preferably provided with an atmospheric vent or drain 150 so that if any fluid manages to leak past either of the seals 92 and 132, such fluid will be discharged and will not enter either of the fluid circuits. The possibility of fluid leaking into chamber 38 is minimized by the arrangement of the various fluid chambers in bore 30. Starting from the rear of bore 30 and working forward, the chambers are arranged so that there is a substantially unpressurized chamber 58, the primary pressurizing chamber 74, and a substantially unpressurized chamber 94, each containing fluid of the type found in the reservoir chamber 44. The chambers 58 and 94 are always connected with reservoir chamber 44 and are therefore at substantially atmospheric pressure at all times. There is little likelihood that fluid at atmospheric pressure will leak to the atmosphere past the seals provided for these chambers. Continuing forwardly in the bore, the buffer chamber 38 is provided, and then the substantially unpressurized chamber 128, ending with the pressurizing chamber 122. Thus chambers 74 and 122, which contain high fluid pressures at various times, are not positioned directly adjacent the anti-contaminant or buffer chamber 38 but are separated therefrom by substantially unpressurized brake fluid-containing chambers.

The master cylinder embodying the invention has a "take-apart and service separate" capability which is not found in prior constructions. By removing suitable fastening means holding the housing front section 16 and the rear section 14 together, the front section may be entirely removed from the rear section and serviced independently. Similarly, by splitting the housing at this point, the rear section may be removed and serviced independently of the front section.

In the particular brake system shown in the drawing, wherein drum brakes are used at the rear wheels and disc brakes at the front wheels of a vehicle, it is necessary to provide means of withholding hydraulic actuation pressure from the front brakes until the rear brakes spring bias is nearly overcome. This bias occurs because the rear brake shoe retractor springs must be overcome and the brake shoes must be moved outwardly to engage the brake drum by relatively small area wheel brake cylinders, as compared to the large front brake piston apply area. Also, disc brakes which may be utilized often have no retractor springs, but permit the brake pads to ride lightly on the disc at all times. This withholding action is accomplished by the provision wherein brake actuation by the operator causes force to be transmitted through push rod 54 to piston 52, through the preloaded spring 80 to rod head 84, until the O ring 109 and then the washer 98 engage the spring seat 108. This movement is sufficient to move secondary pressurizing piston 116 forwardly so that compensation port 126 is closed by cup 118. Thus the initial force for this purpose is applied through the preloaded spring 80. There is also an additional force applied to the rod head 84 since piston 52 will move to close port 46 by cup 64 and will slightly pressurize fluid in the primary pressurizing chamber 74. As additional force is transmitted to piston 52, fluid is further pressurized in chamber 74 and builds up to an amount sufficient to overcome the retractor springs of the brakes 22, so that the shoes are moved into engagement with the brake drum. The preload force on spring 102 is sufficient to prevent further forward movement of the intermediate push rod 28 until sufficient brake pressure is provided in chamber 74 for this purpose. Additional brake force applied through push rod 54 then builds up additional fluid pressure in chamber 74 which will cause spring 102 to yield and pressure to be built up in the secondary pressurizing chamber 122 for the front brakes. The provision of spring 102 will cause the pressure to be built up in the front brakes in the secondary pressurizing chamber at a different rate, from the build-up of pressure in pressurizing chamber 74. The relative rates of pressure buildup may be regulated by the provision of a suitable spring 102. When greater rate of pressure build-up is required for the front set of brakes, as may occur when similar brakes are utilized on both front and rear wheels of a vehicle, the primary pressurizing chamber 74 may then be connected to the front brakes and the secondary chamber to the rear brakes.

What is claimed is:

1. A two fluid pressurizing system comprising housing means, first and second fluid circuits respectively including first and second fluid pressurizing chambers in said housing means and respectively having first and second substantially unpressurized fluid chambers adjacent thereto and positioned between said pressurizing chambers in said housing means, said first and second fluid circuits respectively having first and second fluid reservoirs fluid connected respectively with said first and second substantially unpressurized fluid chambers and also respectively fluid connected with said first and second fluid pressurizing chambers when unpressurized, means responsive to pressurizing actuation of said first fluid pressurizing chamber to disconnect the fluid connection between said second fluid reservoir and said second fluid pressurizing chamber, means acting on said pressurizing actuation responsive means and withholding pressurizing actuation of said second fluid pressurizing chamber until a predetermined pressure level is reached in said first fluid pressurizing chamber, and a fluid circuit anti-contaminant chamber positioned between said substantially unpressurized fluid chambers in said housing means.

2. A two fluid pressurizing system comprising housing means, first and second fluid circuits respectively including first and second fluid pressurizing chambers in said housing means and respectively having first and second substantially unpressurized fluid chambers adjacent thereto and positioned between said pressurizing chambers in said housing means, said first and second fluid circuits respectively having first and second fluid reservoirs fluid connected respectively with said first and second substantially unpressurized fluid chambers and also respectively fluid connected with said first and second fluid pressurizing chambers when unpressurized, means responsive to pressurizing actuation of said first fluid pressurizing chamber to disconnect the fluid connection between said second fluid reservoir and said second fluid pressurizing chamber, said pressurizing actuation responsive means being responsive to pressure increase in said first fluid pressurizing chamber above a predetermined level to pressurized fluid in said second fluid pressurizing chamber in accordance with said pressure increase, and a fluid circuit anti-contaminant chamber position between said substantially unpressurized fluid chambers in said housing means.

3. A two fluid pressurizing system comprising housing means, first and second fluid circuits respectively including first and second fluid pressurizing chambers in said housing means and respectively having first and second stantially unpressurized zuid chambers and also respectiveto and positioned between said pressurizing chambers in said housing means, said first and second fluid circuits respectively having first and second fluid reservoirs fluid connected respectively with said first and second substantially unpressurized fluid chambers and also respectively fluid connected with said first and second fluid pressurizing chambers when unpressurized, means responsive to pressurizing actuation of said first fluid pressurizing chamber to disconnect the fluid connection between said second fluid reservoir and said second fluid pressurizing chamber, said pressurizing actuation responsive means being responsive to pressure increase in said first fluid pressurizing chamber above a predetermined level to pressurize fluid in said second fluid pressurizing chamber in accordance with said pressure increase, means causing the rate of pressure increase in said second fluid pressurizing chamber to be at a different rate from the rate of pressure increase in said first fluid pressurizing chamber, and a fluid circuit anti-contaminant chamber position between said substantially unpressurized fluid chambers in said housing means.

4. A fluid pressure system comprising first and second separate fluid pressure circuits respectively having first and second fluid pressurizing chambers and first and second pressurizing pistons respectively in said chambers, force applying means for moving said first pressurizing piston in a direction for pressurizing fluid, pressurizing-force transmitting means interconnecting said pressurizing pistons and including a push rod having a head forming a movable wall of said first pressurizing chamber and a preloaded spring mechanically engaging said rod head and said first piston, first and second substantially unpressurized chambers respectively adjacent and intermediate said pressurizing chambers, and a buffer chamber separating said substantially unpressurized chambers, said rod extending through said first substantially unpressurized chamber and said buffer chamber and engaging said second piston.

5. The fluid pressure system of claim 4, said preloaded spring mechanically transmitting an initial force from said first piston to said push rod and pressurization of fluid in said first pressurizing chamber by movement of said first piston acting on said rod head transmitting additional force to said push rod, said initial force being a predetermined amount sufficient to move said second piston to pressurize fluid in said second fluid pressurizing chamber to a predetermined pressure level, said additional force acting on said second piston through said push rod to further pressurize fluid in said second fluid pressurizing chamber.

6. The fluid pressure system of claim 5 further comprising lost motion force transmitting means intermediate said first piston and said rod head and mechanically connecting said first piston and said rod head in force transmitting relation upon a predetermined movement of said first piston toward and relative to said rod head for the transmission of further force therebetween.

7. The fluid pressure system of claim 5 further comprising second piston pressurizing force resisting means in said buffer chamber having a lost motion connection with said push rod and connected therewith in force resisting relation upon sufficient movement of said push rod in response to said initial force moving said second piston to pressurize fluid in said second fluid pressurizing chamber to said predetermined pressure level, said force resisting means being yieldable to said additional force at a predetermined rate to establish a lower rate of pressure generation in said second fluid pressurizing chamber than in said first fluid pressurizing chamber.

8. A brake master cylinder assembly comprising a housing having a bore therein and a first chamber dividing said bore into a primary section and a secondary section, a primary fluid reservoir and a secondary fluid reservoir respectively fluid connected with said primary and secondary bore sections, said primary bore section having a primary piston and an intermediate piston therein defining therebetween a primary pressurizing chamber selectively fluid connected with said primary fluid reservoir, said secondary bore section having a secondary piston therein and defining therewith a secondary pressurizing chamber axially opposite said chamber from said primary pressurizing chamber and selectively fluid connected with said secondary fluid reservoir, first brake fluid pressure outlet means for said primary pressurizing chamber and second brake fluid outlet means for said secondary pressurizing chamber, seal means in said primary bore section adjacent said first chamber, an intermediate push rod mechanically connecting said intermediate piston and said secondary piston and extending through said seal means and said first chamber, said seal means and said intermediate piston defining a first unpressurized fluid chamber in said primary bore section fluid connected to said primary fluid reservoir, and said secondary piston having a circumferentially extending groove cooperating with said secondary bore section between said first chamber and said secondary pressurizing chamber to define a second unpressurized fluid chamber fluid connected to said secondary fluid reservoir.

9. The brake master cylinder assembly of claim 8, said primary reservoir having removably sealed cover means permitting fluid replenishment thereof and said secondary fluid reservoir having a fluid inlet and a fluid outlet adapted to be connected in series to a fluid pump inlet and outlet and a fluid heat exchange.

10. The brake master cylinder assembly of claim 9 in combination with a brake cooling circuit having: a fluid cooling pump having a pump inlet and a pump outlet, a heat exchanger, and fluid cooled brakes actuatable by pressurized brake fluid from said secondary pressurizing chamber; said secondary fluid reservoir having a fluid inlet and a fluid outlet connected in series with said fluid cooling pump and said heat exchanger.

11. The combination of claim 10 wherein said fluid cooled brakes are connected in series with said fluid cooling pump and said heat exchanger but in parallel with said secondary fluid reservoir.

12. The brake master cylinder assembly of claim 8, further comprising a preloaded spring extending between said primary piston an said intermediate piston and providing force limiting mechanical force transmitting means in cooperation with said intermediate piston and said intermediate push rod between said primary piston and said secondary piston whereby pressurizing movement of said primary piston is transmitted to said secondary piston to close the connection between said secondary fluid reservoir and said secondary pressurizing chamber substantially concurrently with the closing of the connection of said primary pressurizing chamber and said primary fluid reservoir by movement of said primary piston.

13. The brake master cylinder assembly of claim 12, said intermediate push rod having an abutment thereon, a compression spring in said first chamber having a spring seat axially movable relative to said intermediate push rod, said abutment having a lost motion relation to said spring seat whereby the lost motion thereof is taken up by the secondary pressurizing chamber disconnecting movement of said intermediate push rod, said first chamber compression spring withholding further movement of said intermediate push rod and therefore of said secondary piston until a predetermined pressure buildup occurs in said primary pressurizing chamber and acting on said intermediate piston, after which said first chamber compression spring permits secondary piston pressurizing movement of said intermediate push rod and said secondary piston by pressure in said primary pressurizing chamber to pressurize fluid in said secondary pressurizing chamber at a predetermined rate relative to the rate of pressurization of fluid in said primary pressurizing chamber.

14. The brake master cylinder assembly of claim 13, said intermediate push rod abutment including a shoulder and a washer engaging said shoulder and an O-ring extending axially intermediate said washer and said spring seat, said O-ring providing substantially silent engagement between said abutment and said spring seat.

15. The brake master cylinder assembly of claim 13, the end of said first chamber adjacent said primary bore section having a rubber-like gasket received in the end thereof and engageable with said spring seat whereby movement of said spring seat toward said primary bore section causes said spring seat to engage said rubber-like gasket in silent engaging relation.

References Cited

UNITED STATES PATENTS

| 2,640,324 | 6/1953 | Spahn | 60—54.6 |
| 3,245,726 | 4/1966 | Stelzer | 60—54.5 X |

FOREIGN PATENTS

| 482,796 | 4/1938 | Great Britain. |

MARTIN P. SCHWADRON, *Primary Examiner.*
ROBERT R. BUNEVICH, *Examiner.*

UNITED STATES PATENT OFFICE
CERTIFICATE OF CORRECTION

Patent No. 3,354,639                         November 28, 1967

Frederick R. Yost

It is hereby certified that error appears in the above numbered patent requiring correction and that the said Letters Patent should read as corrected below.

Column 1, line 43, for "vehicle" read -- vehicles --; column 2, line 63, for "ssytems" read -- systems --; column 4, line 39, for "celars" read -- clears --; line 43, for "An" read -- A --; column 5, line 15, for "povided" read -- provided --; column 6, line 67, for "pressurized" read -- pressurize --; line 69, for "position" read -- positioned --; line 75, for "stantially unpressurized zuid chambers and also respective-" read -- substantially unpressurized fluid chambers adjacent --; column 7, line 1, for "to" read -- thereto --; line 19, for "position" read -- positioned --; column 8, line 29, for "exchange" read -- exchanger --; line 44, for "an" read -- and --.

Signed and sealed this 14th day of January 1969.

(SEAL)
Attest:

EDWARD M. FLETCHER, JR.                      EDWARD J. BRENNER
Attesting Officer                              Commissioner of Patents